United States Patent [19]

Turner et al.

[11] Patent Number: 5,104,910

[45] Date of Patent: Apr. 14, 1992

[54] COMBUSTION-MODIFIED POLYURETHANE FOAM

[75] Inventors: Robert B. Turner; Ralph D. Priester, Jr.; Stephen R. Burkes, all of Lake Jackson, Tex.

[73] Assignee: The Dow Chemical Company, Midland, Mich.

[21] Appl. No.: 637,105

[22] Filed: Jan. 3, 1991

[51] Int. Cl.$^5$ .............................. C08G 18/14
[52] U.S. Cl. ...................... 521/163; 521/164; 521/170; 252/182.13; 252/182.17; 252/182.24; 252/182.26; 564/310; 564/311; 564/313; 564/430; 564/440; 564/443; 568/21; 568/22; 568/23; 568/25; 568/558; 568/567
[58] Field of Search ............ 521/163, 164, 170; 252/182.13, 182.17, 182.24, 182.26; 564/310, 311, 313, 430, 440, 443; 568/21, 22, 23, 25, 558, 567

[56] References Cited

U.S. PATENT DOCUMENTS

| | | | |
|---|---|---|---|
| 2,846,408 | 8/1958 | Brochhagen et al. | 260/885 |
| 4,148,840 | 4/1979 | Shah | 521/51 |
| 4,218,543 | 8/1980 | Weber et al. | 521/159 |
| 4,269,945 | 5/1981 | Vanderhider et al. | 521/159 |
| 4,374,210 | 2/1983 | Ewen et al. | 521/159 |
| 4,390,645 | 6/1983 | Hoffman et al. | 521/137 |
| 4,463,107 | 7/1984 | Simroth et al. | 521/137 |
| 4,574,137 | 3/1986 | Serratelli et al. | 524/724 |
| 4,579,700 | 4/1986 | Cavender | 524/724 |
| 4,722,942 | 2/1988 | Nichols et al. | 521/110 |
| 4,910,379 | 3/1990 | Gillis et al. | 528/49 |

OTHER PUBLICATIONS

California Dept. of Consumer Affairs, Bureau of Home Furnishings, Technical Bulletin No. 117., Jan. 1980 (Cal 117 test).
Standard No. 302; Flammabaility of Interior Materials (1984) (MVSS-302 Test), 49 CFR 547.302.

Primary Examiner—Maurice J. Welsh
Attorney, Agent, or Firm—Ann K. Galbraith

[57] ABSTRACT

Described herein is an isocyanate-reactive compound containing at least one linkage of the formula:

$$-X-X-$$

wherein X is independently in each occurrence —NR—, —S—, or —O—; R is independently in each occurrence hydrogen, $C_{1-10}$ alkyl, aryl, or arylene; and at least one N, S, or O atom of the above formula is bonded to an aryl or arylene group. Also disclosed are isocyanate-reactive compositions containing the above compound and flexible polyurethane foams prepared therefrom.

18 Claims, No Drawings

COMBUSTION-MODIFIED POLYURETHANE FOAM

BACKGROUND OF THE INVENTION

This invention relates to polyurethane foams, more particularly to polyurethane foams which exhibit excellent flame resistance in small scale burn testing. The terms "combustion-modified," "flame resistant" and similar terms as used herein refer to a material's performance in laboratory flammability tests, and are not meant to describe performance under actual fire conditions.

Flexible polyurethane foams are widely used as cushioning material in, for example, furniture, automobile seating, impact-reducing medias, and the like. One concern regarding the use of these foams is their performance under fire conditions, particularly their ability to resist igniting and to extinguishing themselves when exposed to flame.

Many attempts have been made to reduce the flammability of polyurethane foams. The most common method is to incorporate a halogenated compound or phosphate ester flame retarding agent into the foam formulation. These agents have been somewhat successful in reducing the flammability of the foams. However, the use of these flame retarding agents has several substantial drawbacks. Although they are somewhat successful in suppressing flames, under fire conditions they decompose to form toxic gases, particularly gaseous halogen-containing compounds such as HCl and HBr. Foams containing these agents, although they resist flames, sometimes smolder during fires. In preparing the foams, the halogenated flame retarding agents often scorch the interior of the foam, which is believed to cause degradation of the foam properties. In addition, these flame retardants deactivate many of the catalysts used in the foam formulation. Moreover, many companies do not like to introduce halogenated compounds into the workplace for fear of worker exposure. In addition, relatively large quantities of these agents must be used in order to obtain satisfactory results, adding significantly to the cost of the foam.

Other types of flame retardant additives are described in U.S. Pat. No. 4,722,942, which discloses the use of fire retardant additives comprising hydroxyl-terminated alkanes having a plurality of primary hydroxyl groups and alkylene ethers and polyethers having a plurality of primary hydroxyl groups. However, the primary hydroxyl-containing compounds described above are often incompatible with the high molecular weight polyols used in the preparation of polyurethane foams. In addition, the use of these primary hydroxyl-containing compounds also produces foams which have physical properties which are less than desirable for some applications.

In view of the foregoing, it would be desirable to provide a polyurethane foam which does not release halogen-containing gases when burned, which does not present the processing and exposure problems associated with the halogenated and phosphate ester agents, which is compatible with the high molecular weight polyols used in the preparation of polyurethane foams, and which produces foams with better physical properties than those obtainable from the use of the conventional flame retardant additives described above.

SUMMARY OF THE INVENTION

This invention is in one aspect an isocyanate-reactive compound containing at least one linkage of the formula:

$$-X-X-$$

wherein X is independently in each occurrence $-NR-$, $-S-$, or $-O-$; R is independently in each occurrence hydrogen, $C_{1-10}$ alkyl, aryl, or arylene; and at least one N, S, or O atom of the above formula is bonded to an aryl or arylene group.

In a second aspect, this invention is an isocyanate-reactive composition, comprising at least one isocyanate-reactive compound containing at least one linkage of the formula:

$$-X-X-$$

as described above, wherein the composition comprises at least about 0.5 percent by weight of the isocyanate-reactive compound of the first aspect of the invention.

In a third aspect, this invention is a flexible polyurethane foam prepared by reacting a polyisocyanate with the isocyanate-reactive composition of the second aspect of the invention, in the presence of a blowing agent.

Polyurethane foams prepared from the isocyanate-reactive compound of the invention possess the ability to pass many small scale burn tests, by melting and flowing under flame conditions. While not limiting the invention to any scientific theory, it is believed that the isocyanate-reactive compounds of the invention contain a thermally "weak link" which dissociates under flame conditions, causing the foam to melt and flow away from the flame.

Polyurethane foams prepared from the isocyanate-reactive compound of the invention also advantageously possess better physical properties than polyurethane foams prepared using conventional flame retardant additives. The isocyanate-reactive compound of the invention also provides better processing characteristics for the preparation of the foam, since conventional flame retardant additives may release HCl during processing, which may deactivate any urethane catalysts present in the polyurethane foam formulation.

DETAILED DESCRIPTION OF THE INVENTION

In its first aspect, this invention is an isocyanate-reactive compound containing at least one linkage of the formula:

$$-X-X-$$

wherein X is independently in each occurrence $-NR-$, $-S-$, or $-O-$; R is independently in each occurrence hydrogen, $C_{1-10}$ alkyl, aryl, or arylene; and at least one N, S, or O atom of the above formula is bonded to an aryl or arylene group. Preferably, $-X-X-$ is $-NH-NH-$ or $-O-O-$, and is most preferably $-NH-NH-$. Preferably, at least one N, S, or O atom is bonded to an aryl group. Preferably, both $-X-$'s are bonded to at least one aryl or arylene group. The alkyl, aryl, or arylene groups of the above formula are preferably unsubstituted, but may optionally be substituted with groups which do not interfere the dissociation of the —X—X— linkage under flame conditions.

The term "isocyanate-reactive compound" as used herein includes any organic compound having at least two isocyanate-reactive moieties, such as a compound containing an active hydrogen moiety, or an imino-functional compound. For the purposes of this invention, an active hydrogen moiety refers to a moiety containing a hydrogen atom which, because of its position in the molecule, displays significant activity according to the Zerewitnoff test described by Wohler in the Journal of the American Chemical Society, Vol. 49, p. 3181 (1927). Illustrative of such active hydrogen moieties are —COOH, —OH, —NH$_2$, —NH—, —CONH$_2$, —SH, and —CONH—. Typical active hydrogen containing compounds include polyols, polyamines, polymercaptans and polyacids. Suitable imino-functional compounds are those which have at least one terminal imino group per molecule, such as are described, for example, in U.S. Pat. No. 4,910,279, which is hereby incorporated by reference in its entirety. Preferably, the isocyanate-reactive compound is a polyol.

The isocyanate-reactive compound of the invention is characterized by having an average functionality of about 1 to about 7, preferably about 2 to about 3. The isocyanate-reactive compound has an equivalent weight of at least about 100, more preferably at least about 500, and most preferably at least about 1,000; and is preferably no greater than about 10,000, more preferably no greater than about 4,000, and most preferably no greater than about 2,000.

The isocyanate-reactive compounds of the invention may be prepared by methods commonly used to prepare polyether polyols such as those described below, using an initiator compound containing two or more active hydrogen groups which contains a linkage of the formula:

wherein X is independently in each occurrence —NR—, —S—, or —O—; R is independently in each occurence hydrogen, $C_{1-10}$ alkyl, aryl, or arylene; and at least one N, S, or O atom of the above formula is bonded to an aryl or arylene group.

In a second method, the isocyanate-reactive compounds of the invention which contain hydrazine linkages (wherein —X—X— is —NH—NH—) may be prepared by (1) contacting (a) a polymeric polyol with (b) a halogenated nitroaromatic compound of the formula:

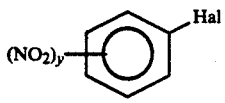

under reaction conditions sufficient to form the corresponding polyol with at least one nitroaromatic end group, and then (2) coupling at least two of these polyols together such that the nitroaromatic end groups of the polyols couple to form a hydrazine linkage. In the above formula, Hal is a halogen group such as fluorine, chlorine, bromine, and iodine, and y is a whole number from 1 to 5, and is most preferably 1 or 2. Preferably, Hal is chlorine or bromine, and is most preferably chlorine. Examples of suitable halogenated nitroaromatic compounds include o- or p-nitrochlorobenzene and dinitrochlorobenzene.

Suitable polyols useful in step (1) of the preparation of the isocyanate-reactive compounds of the invention include, for example, polyether polyols, polyester polyols, poly(alkylene carbonate)polyols, hydroxyl-containing polythioethers, polymer polyols, and mixtures thereof. Polyether polyols are well-known in the art and include, for example, polyoxyethylene and polyoxypropylene diols and triols which are prepared by reacting an unsubstituted or halogen- or aromatic-substituted ethylene oxide or propylene oxide with an initiator compound containing two or more active hydrogen groups such as water, ammonia, a polyalcohol, or an amine. Such methods are described, for example, in U.S. Pat. Nos. 4,269,945, 4,218,543, and 4,374,210, which are hereby incorporated by reference in their entirety. In general, polyether polyols may be prepared by polymerizing alkylene oxides in the presence of an active hydrogen-containing initiator compound. Most preferred, however, are ethylene oxide-capped polyols prepared by reacting glycerine with propylene oxide, followed by reacting with ethylene oxide.

Suitable alkylene oxides include ethylene oxide, propylene oxide, butylene oxides, styrene oxide, epichlorohydrin, epibromohydrin, and mixtures thereof. Suitable initiator compounds include water, ethylene glycol, propylene glycol, butanediol, hexanediol, glycerin, trimethylol propane, pentaerythritol, hexanetriol, sorbitol, sucrose, hydroquinone, resorcinol, catechol, bisphenols, novolac resins, phosphoric acid, amines, and mixtures thereof.

Polyester polyols are also well-known in the art and may be prepared by reacting a polycarboxylic acid or anhydride thereof with a polyhydric alcohol. Examples of suitable polycarboxylic acids include succinic acid, adipic acid, suberic acid, azelaic acid, sebacic acid, pthalic acid, isophthalic acid, maleic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, maleic acid anhydride, glutaric acid anhydride, fumaric acid, an mixtures thereof. Examples of suitable polyhydric alcohols include ethylene glycols, propane diols, butane diols, 1,6-hexanediol, 1,8-octanediol, neopentylglycol, glycerol, trimethylol propane, pentaerythritol, quinitol, mannitol, sorbitol, methyl glycoside, diethylene glycol, triethylene glycol, tetraethylene glycol, polyethylene glycols, polypropylene glycols, and mixtures thereof.

Suitable polymer polyols include dispersions of polymers of vinyl monomers in a continuous polyol phase, particularly dispersions of styrene/acrylonitrile copolymers. Also useful are the so-called polyisocyanate polyaddition (PIPA) polyols (dispersions of polyurea-polyurethane particles in a polyol) and the polyurea dispersions in polyols (PHD polyols). Copolymer polyols of the vinyl type are described, for example, in U.S. Pat. Nos. 4,390,645, 4,463,107, 4,148,840 and 4,574,137, all incorporated by reference. Preferred are polyether polyols and copolymer polyols of the vinyl type, particularly styrene/acrylonitrile dispersions.

The most preferred polymeric polyols are poly(propylene oxide)polyols having 2-3 hydroxyl groups per molecule, which are end-capped with ethylene oxide so at least about 70 percent of the hydroxyl groups are primary hydroxyls, and/or styrene/acrylonitrile dispersions containing about 25–55 weight percent dispersed particles in said poly(-propylene oxide)polyols.

As mentioned above, the second step for the preparation of the isocyanate-reactive compounds of the invention containing hydrazine linkages comprises coupling at least two of the polyols containing at least one nitroaromatic end group together such that the nitroaromatic end groups of the polyols couple to form a hydrazine linkage. This reaction may be illustrated by the following formula:

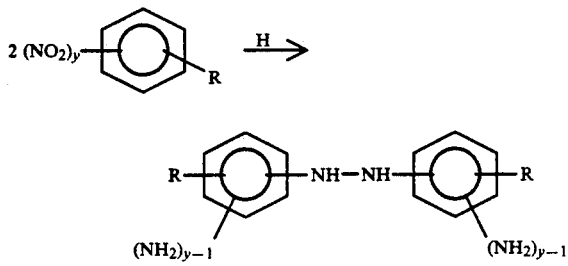

wherein R is the residue of the polymeric polyol.

Preferably, this reaction is carried out by a catalytic hydrogenation method using a method and/or a catalyst which does not permit the complete hydrogenation of many of the nitro groups attached to the aromatic groups, which permits the coupling of the polyols. This may be accomplished by partial deactivation of the catalyst, by adding a stoichiometric amount of HCl, relative to the concentration of the catalyst to the reaction mixture, or by exposing the catalyst to oxygen for a period of time, such as by purging the catalyst with oxygen instead of nitrogen.

For typical hydrogenation methods see "Catalytic Hydrogenation over Platinum Metals" by Paul N. Rylander, 1967, Academic Press, New York, N.Y. Any of the catalysts known to be useful for the reduction of aromatic nitro groups can be employed inclusive of Raney nickel. A preferred group of catalysts is comprised of the platinum group metals which includes ruthenium, rhodium, palladium, osmium, iridium, and platinum. Preferably, the catalyst is supported on a carrier such as activated carbon, silica gel, alumina, diatomaceous earth, pumice, and the like. The exact proportions in which the elemental metal is present on the carrier is not a critical factor. Generally speaking, the metal can vary from 0.05 to 40 percent by weight, preferably from 0.5 to 20, and, most preferably, from 5 to 10 percent by weight.

The proportions of catalyst employed expressed as the pure metal in respect of the nitro group to be reduced will advantageously fall within the range of from 0.05 to 10 mole percent of metal per equivalent of nitro group. Preferably, the range is from 0.1 to 1.0 mole percent. The term "equivalent of nitro group" means the nitro equivalent weight which is obtained by dividing the molecular weight of the nitroaromatic compound (II) by the number of nitro groups per mole.

The hydrogenation is conducted in the liquid phase in the presence of the hydrogen and the catalyst component which, generally speaking, calls for the use of a solvent but the latter is not absolutely necessary. Any solvent known to be useful for catalytic hydrogenation methods but inert to the compounds (I) and (II) may be employed. Illustratively, the following solvents can be used solely or as mixtures thereof: aromatic hydrocarbons such as benzene, toluene and xylene; alcohols such as methanol, ethanol, propanol and isopropanol; esters such as ethyl acetate, ethyl propionate and ethyl butyrate; ethers such as dioxane and tetrahydrofuran; and water, either alone or in combination with the above solvents. The use of liquid ammonia is also contemplated. The amount of solvent is not critical per se and any amount found to be efficacious can be employed. Advantageously, the nitroaromatic compound (II) is employed in at least 10 percent by weight in the solvent, preferably, from 20 to 70 percent by weight, and most preferably, from 25 to 50 percent by weight.

The exact choice of temperature in any given hydrogenation is a function of, for example, the specific catalyst activity and hydrogen pressure. Advantageously, it can fall within a range of from 0° C. to 200° C., preferably from 15° C. to 100° C., most preferably from 20° C. to 50° C.

Similarly, as with temperature noted above, the hydrogen pressure employed can cover any effective range such as from 15 psig (100 kPa gauge) up to any reasonable working pressure. Generally speaking, the pressure will be from 15 psig (100 kPa gauge) to 200 psig (1400 kPa gauge), preferably from 30 (100) to 60 psig (300 kPa gauge).

Progression of the reduction is readily followed by monitoring the hydrogen uptake. Accordingly, the reduction is terminated at the point at which the theoretical quantity of hydrogen has been absorbed. Alternatively, the reduction is continued until no further hydrogen can be consumed.

Another suitable process for the preparation of the isocyanate-reactive compounds of the invention which contain hydrazine linkages comprises reacting the corresponding hydroxyl- or primary amine-terminated polyether or polyester with a material such as nitroanisole or a lower alkyl ester of p-aminobenzoic acid, particularly the methyl ester, followed by reduction of the nitro group, to generate the isocyanate-reactive compounds of the invention which contain hydrazine linkages.

A third suitable process for the preparation of the isocyanate-reactive compounds of the invention which contain hydrazine linkages comprises the use of an aromatic hydrazine as an initiator compound in the preparation of a polyether polyol using one of the methods described above for the preparation of polyether polyols.

In a second aspect, this invention is an isocyanate-reactive composition, comprising at least one isocyanate-reactive compound containing at least one linkage of the formula:

$$-X-X-$$

as described above, wherein the isocyanate-reactive composition comprises at least about 0.5 percent by weight of the isocyanate-reactive compound of the first aspect of the invention.

Additional isocyanate-reactive compounds useful in the isocyanate-reactive composition of the invention are characterized by having an average functionality of about 2 to about 5, preferably about 2 to about 3. The active hydrogen containing compounds have an equivalent weight of at least about 750, more preferably at least about 1,000, and most preferably at least about 1,666; and is preferably no greater than about 4,000, more preferably no greater than about 3,000, and most preferably no greater than about 2,000. However, the preferred equivalent weight of the isocyanate-reactive compounds depends somewhat on the type of foam being made, and the method of its manufacture. For making a molded polyurethane foam in a hot cure process, the isocyanate-reactive compounds preferably have an equivalent weight of from 500 to 2500, more preferably from 700 to 2000, and most preferably from 800 to 1500. For making slabstock foam or a molded polyurethane foam in a cold cure process, the most preferred equivalent weight is from 500 to 1800. In addition, preferably at least about 50 percent, and more preferably at least about 80 percent of the reactive hydroxyl groups contained in the polyol are primary hydroxyls.

The isocyanate-reactive composition of the invention is preferably prepared in the presence of at least one isocyanate-reactive compound which does not contain the linkage —X—X—. When such additional isocyanate-reactive compounds are employed, they are preferably employed in an amount so that the linkage —X—X— is present in an amount sufficient to enable the resulting polyurethane foam prepared therefrom to have a 0.0 burn rate using the Calif. 117 test described hereafter. Preferably, the composition of the invention comprises at least about 0.5 percent, more preferably at least about 1.0 percent, and most preferably at least about 2.5 percent; and is preferably no greater than about 10 percent, more preferably no greater than about 8 percent, and most preferably no greater than about 7 percent of the isocyanate-reactive composition. In terms of the weight percent of —X—X— linkages present, the composition of the invention most preferably contains at least about 0.3 percent by weight of such linkages.

In its third aspect, this invention is a flexible polyurethane foam prepared by reacting a polyisocyanate with the isocyanate-reactive composition of this invention, in the presence of a blowing agent. The foam may optionally be prepared in the presence of additional isocyanate-reactive compounds, other than the isocyanate-reactive compounds of the invention, such as those described above.

Either aliphatic or aromatic polyisocyanates can be used in this invention to make foam. Suitable aliphatic polyisocyanates include, for example, ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate, 1,5-diisocyanato-3,3,5-trimethylcyclohexane, 2,4- and/or 2,6-hexahydrotoluene diisocyanate, perhydro-2,4'- and/or -4,4'-diphenylmethanediisocyanate ($H_{12}MDI$) and isophorone diisocyanate.

Suitable aromatic polyisocyanates include, for example, 2,4- and/or 2,6-toluene diisocyanate (TDI), 2,4'-diphenylmethanediisocyanate, 1,3- and 1,4-phenylene diisocyanate, 4,4'-diphenylmethane diisocyanate (including mixtures thereof with minor quantities of the 2,4'-isomer), 1,5-naphthylene diisocyanate, triphenylmethane-4,4',4''-triisocyanate and polyphenyl-polymethylene polyisocyanates. When the polyisocyanate is MDI or a derivative of MDI, especially a mixture including a polymeric MDI, it is preferred that the amine-terminated compound be substantially difunctional, i.e., have an average functionality of 1.5 to 2.2, preferably 1.8 to 2.1, more preferably from 1.9 to 2.05.

In addition, derivatives and prepolymers of the foregoing polyisocyanates such as those containing urethane, carbodiimide, allophanate, isocyanurate, acylated urea, biuret, ester and similar groups are useful herein. Of these, prepolymers of TDI and MDI, and the so-called "liquid MDI" products which contain carbodiimide groups and have an equivalent weight of from 130 to 150 are of particular significance.

Of the foregoing polyisocyanates, TDI, MDI, isophorone diisocyanate, $H_{12}MDI$, hexamethylene diisocyanate, cyclohexane diisocyanate and derivatives thereof are preferred due to their cost, commercial availability and performance. TDI, MDI and derivatives of MDI are most preferred. TDI, particularly mixtures of the 2,4- and 2,6-isomers, is especially preferred.

The polyisocyanate is used in an amount sufficient to provide an isocyanate index of from 60 to 200, preferably from 90 to 125, more preferably from 95 to 110. At higher indices, trimerization of the polyisocyanate occurs, causing the foam to lose flexibility. At lower indices, insufficient curing occurs, causing the foam to have poor properties. When MDI or derivative thereof is used as the polyisocyanate, preferred isocyanate indices are from 60 to 110, with from 70 to 103 being more preferred, as MDI tends to provide a board-like foam at indices greater than 110, but provides a highly resilient foam at indices as low as 60. The "isocyanate index" is 100 times the ratio of isocyanate groups to active hydrogen-containing groups contained in the mixture which reacts to form the foam.

A blowing agent is another critical component of polyurethane foam of the invention. The blowing agent is any material which is capable of generating a gas under the conditions of the reaction of a polyisocyanate and a polyol. Such materials include air, carbon dioxide, nitrogen, water, formic acid, low-boiling halogenated alkanes, finely divided solids and the so-called "azo" blowing agents such as azobis(formamide). Preferred are water, the low-boiling halogenated alkanes, or mixtures thereof. Blowing agents are advantageously employed in a quantity sufficient to provide the foam with a bulk density of from 0.5, preferably 0.9, more preferably 1.1 to 6 or less, preferably 4, more preferably 3 pounds per cubic foot. The halogenated alkanes, including methylene chloride, dichlorodifluoromethane and monochlorodifluoromethane and monochlorotrifluoromethane, generally provide the desired density when employed in amounts of from 5 to 50 parts per 100 parts relatively high equivalent weight compound. Lesser amounts are useful when employed in conjunction with another blowing agent, such as water.

A catalyst for the reaction of the composition and the polyisocyanate is also used in making foam according to this invention. Although a wide variety of materials are known to be useful for this purpose, the most widely used and preferred catalysts are the tertiary amine catalysts and the organometallic catalysts.

Exemplary tertiary amine catalysts, include, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-diethyl-3-diethylaminopropylamine, dimethylbenzyl amine and bis(2-dimethylaminoethyl)ether. Tertiary amine catalysts are advantageously employed in an amount of from 0.01 to 5, preferably from 0.05 to 2 parts per 100 parts by weight of the amine-terminated compound.

Exemplary organometallic catalysts include organic salts of metals such as, for example, tin, bismuth, iron, mercury, zinc and lead, with the organotin compounds being preferred. Suitable organotin catalysts include, for example, dimethyl-tindilaurate, dibutyltindilaurate and stannous octoate. Other suitable catalysts are taught, for example, in U.S. Pat. No. 2,846,408. Advantageously, from 0.001 to 0.5 part by weight of an organometallic catalyst is used per 100 parts of amine-terminated compound.

Polyurethane foam is prepared according to this invention by contacting the composition, blowing agent, polyisocyanate and catalyst together under conditions such that the components react to form a cellular polymer. Generally, the reaction mixture may contain additional components such as cross-linkers, catalysts, surfactants, colorants, cell openers, flame retardants, antioxidants, mold release agents and the like, which may vary according to the desired attributes of the foam, and whether the foam is a molded or slabstock foam.

Cross-linkers may be used, particularly in making molded foam or high resiliency slabstock foam, in order to improve load-bearing and processing. Suitable such cross-linkers include alkanolamines and other compounds of 200 or lower equivalent weight having from 3 to 8, preferably from 3 to 4 active hydrogen-containing groups per molecule. Exemplary such compounds are glycerine and trimethylolpropane, as well as other alkylene triols. Preferred, however, are alkanolamines such as diethanolamine, triisopropanol-amine, triethanolamine, diisopropanolamine, adducts of from 4 to 8 moles of ethylene oxide and/or propylene oxide with ethylene diamine, and polyamines such as, for example, methylene bis(o-chloroaniline), ethylenediamine and ammonia. Most preferred, on the basis of its optimum reactivity, is diethanolamine.

Chain extenders may also be used to further improve the load-bearing of the foam. "Chain extenders," for the purposes of this invention, include compounds having two active hydrogen-containing groups per molecule and an equivalent weight of from 31 to 300, preferably from 31 to 150. Hydroxyl-containing chain extenders include the alkylene glycols and glycol ethers such as ethylene glycol, 1,3-propylene glycol, 1,4-butylene glycol, 1,6-hexamethylene glycol, diethylene glycol, triethylene glycol, dipropylene glycol, tripropylene glycol and 1,4-cyclohexanedi-methanol. Amine chain extenders include diethyltoluene diamine, phenylene diamine, methylene bis(o-chloro-aniline), NaCl blocked methylene bis(aniline), toluene diamine, aromatic diamines which are alkyl substituted on at least one of the carbon atoms adjacent to each amine groups. When chain extenders and cross-linkers are employed, they are preferably employed in a combined amount of at least about 0 parts by weight, more preferably at least about 0.1 parts by weight, most preferably at least about 1.0 parts by weight; and no greater than about 4.0 parts by weight, more preferably at least about 3.0 parts by weight, most preferably at least about 2.0 parts by weight, per 100 parts by weight isocyanate-reactive compound.

In order to make a stable foam, i.e., one which does not collapse or contain significant quantities of large pores, a surfactant which stabilizes the foaming reaction mixture against collapse until the mixture is sufficiently cured to maintain its configuration may be used. Suitable surfactants include siloxane/poly(alkylene oxide) copolymers as described, for example, in U.S. Pat. Nos. 3,887,500 and 3,957,842.

Preferably, the foam is prepared in a one-shot process by mixing all reactive components, catalysts, and optional ingredients and permitting same to react. In preparing molded polyurea-polyurethane foam, all components except the polyisocyanate are advantageously blended together and injected as a single stream into a mixing head. However, certain components such as catalysts or halogenated methane blowing agents are sometimes blended with the polyisocyanate. In addition, the water and surfactant, when used, can be introduced as a separate stream, if desired. The polyisocyanate is added to the mixing head as a separate stream where it is mixed with the polyol mixture and injected into the mold. In performing the mixing and mold filling steps, conventional, low pressure apparatus can be used, or high pressure impingement mixing processes, such as a reaction injection molding process, can be used. Generally, the components are mixed at approximately room temperature, although components such as pure MDI which are solid at room temperature may be heated above their melting points.

In one molding technique (hot molding process), the reactants are placed into a mold which is at ambient temperature. After filling, the mold is placed into an oven at a temperature of from 150° C. to 275° C. to effect curing. In a second technique (cold molding process), the reactants are placed into a mold which is preheated to a temperature of from 30° C. to 75° C. After the mold is filled, it is placed in a 70° C. to 150° C. oven to effect cure. In a third technique, the filled mold is maintained at ambient temperature during the curing process. In this third technique, the mold may or may not be preheated.

Sufficient of the reaction mixture is placed into the mold so that, after expansion, the mixture completely fills the mold. Advantageously, a small excess of material is added over that minimally required to fill the mold. After filling the mold, the reaction mixture is permitted to cure in the mold at least to a state which permits the molded foam to be removed from the mold without permanent undesired distortion. In typical commerical procedures, an in-mold cure time of from 2 to 30 minutes is adequate for this purpose. If required, the foam can be postcured by heating to a temperature of from 50° C. to 120° C. for a period of from 10 minutes to 24 hours, preferably from 20 minutes to 2 hours.

It may be necessary or desirable to mechanically open the cells of the foam during or after cure. This can be done by crushing the foam, puncturing the foam, vacuum crushing the foam, or by releasing the pressure in the mold at a proper stage of cure as taught in U.S. Pat. No. 4,579,700. An advantage of this invention is that the postcure shrinkage associated with inadequate cell opening is usually substantially reduced, thereby reducing or eliminating the need to mechanically open the cells.

In making slabstock foam, the reaction mixture also advantageously contains a surfactant and catalyst as described before. Cross-linkers, although they may be used, are often omitted from slabstock formulations. In the commercial production of slabstock foam, the components can be and typically are introduced individually to a mixing head where they are thoroughly blended and metered onto a bed where foaming takes place. However, preblending of the components, except for the polyisocyanate, can be done if desired. The components are advantageously at room temperature or a slightly elevated temperature when blended in the mixing head, although preheating may be necessary in some instances to melt components which are solid at room temperature.

The foam of this invention is useful, for example, as bedding, furniture cushioning, padding, carpet underlayment, attached cushion carpet backing, automobile head rests, crash pads, door handles, head liners and seating.

The resulting foam has good physical properties and excellent burn properties. For the purposes of this invention, burn properties (flame resistance) are evaluated using a vertical burn test such as described by the State of California Department of Consumer Affairs, Bureau of Home Furnishings, Technical Bulletin No. 117, REQUIREMENTS, TEST PROCEDURE AND APPARATUS FOR TESTING THE FLAME RETARDANCE OF RESILIENT FILLING MATERIALS USED IN UPHOLSTERED FURNITURE. January 1980 (Cal 117 test), incorporated by reference, and/or a horizontal burn test such as is described in 49 CFR 547.302, *Standard No. 302*; *Flammability of interior materials* (1984) (MVSS-302 test).

ILLUSTRATIVE EMBODIMENTS

The following examples are given to illustrate the invention and should not be interpreted as limiting it in any way. Unless stated otherwise, all parts and percentages are given by weight.

EXAMPLE 1

A foam is prepared using the following amounts of the following components:

| EXAMPLE: | C.E. 1* | 1 | C.E. 2* | 2 | 3 | 4 |
|---|---|---|---|---|---|---|
| POLYOL A | 50 | 50** | — | — | | |
| POLYOL B | 50 | 50 | — | — | | |
| POLYOL C | — | — | 100 | 100** | 100** | 50** |
| POLYOL D (V-9435) | — | — | | | | 50 |
| DIETHANOLAMINE | 1.5 | 1.5 | 1.5 | 1.5 | 1.7 | 1.5 |
| water | 3.8 | 3.8 | 3.8 | 3.8 | 3.8 | 3.8 |
| AMINE CATALYST (DABCO 33LV) | 0.5 | 0.5 | 0.02 | 0.12 | 0.12 | 0.5 |
| AMINE CATALYST (NIAX A-1) | — | — | 0.15 | 0.075 | 0.075 | 0.25 |
| AMINE CATALYST (POLYCAT 77) | — | — | — | 0.24 | 0.24 | |
| AMINE CATALYST (NIAX A-107) | 0.75 | 0.75 | — | — | | |
| UNION CARBIDE Y-10184 (silicone surfactant) | 1.2 | 1.2 | — | — | | 1.2 |
| Dow Corning DCF 11630 (silicone surfactant) | — | — | 0.05 | 0.05 | 0.05 | |
| TDI INDEX | 105 | 105 | 105 | 105 | 105 | 105 |
| MVSS-302 RATING | FAIL | PASS | FAIL | PASS | PASS | PASS |
| BURN RATE (IN/SEC) | 0.06 | — | 0.06 | — | | |
| FLAMING DRIPS | YES | — | YES | — | | |

Flammability characteristics referred to in this table are based on data which describes the response of the material to heat or flame under controlled laboratory conditions and should not be used for the appraisal of fire hazards under actual fire conditions.
*Comparative Example
**contains 5 wt % hydrazine-coupled polyol.
POLYOL A — a glycerine-initiated, 18% ethylene oxide-capped, polypropyleneoxy polyol with an equivalent weight of about 1600, available from The Dow Chemical Company.
POLYOL B — a glycerine-initiated, hetero feed (13% e.o., 87% p.o.) polyalkyleneoxy polyol with an equivalent weight of about 1600, available from The Dow Chemical Company.
POLYCOL C — a glycerine-initiated, 90 percent aromatic amine-terminated polypropyleneoxy polyol with an equivalent weight of about 1600, available from The Dow Chemical Company.

Molded foam is made for each of the examples above by thoroughly mixing all of the components except for the TDI. The TDI is then stirred in under high agitation. The blend is poured into an 8"×8"×3" mold which is preheated to 145° F., and after the foam has risen, placing the mold in a 175° F. oven for 3 minutes, at which time the foam is demolded. The resulting foams are cooled and tested one day after manufacture for their burn properties according to the MVSS 302 test, which is a horizontal burn test. "PASS" as used above means that that samples tested scored a 0.0 burn rate on the Calif. 117 test described above. The data shows that the addition of a hydrazine-couple polyol to a polyol composition provides a polyurethane foam which passes the Calif. 117 burn test.

What is claimed is:

1. An isocyanate-reactive compound containing at least one linkage of the formula:

—X—X— wherein X is independently in each occurrence —NR—, —S—, or —O—; R is independently in each occurence hydrogen, $C_{1-10}$ alkyl, aryl, or arylene; and at least one N, S, or O atom of the above formula is bonded to an aryl or arylene group.

2. The isocyanate-reactive compound of claim 1 wherein —X—X— is —NH—NH— or —O—O—.

3. The isocyanate-reactive compound of claim 2 wherein —X—X— is —NH—NH—.

4. The isocyanate-reactive compound of claim 1 wherein at least one N, S, or O atom is bonded to an aryl group.

5. The isocyanate-reactive compound of claim 1 wherein both N, S, or O atoms are bonded to an aryl or arylene group.

6. The isocyanate-reactive compound of claim 1 which has an equivalent weight of at least about 1,000.

7. An isocyanate-reactive composition, comprising at least one isocyanate-reactive compound containing at least one linkage of the formula:

—X—X— wherein X is independently in each occurrence —NR—, —S—, or —O—; R is independently in each occurence hydrogen, $C_{1-10}$ alkyl, aryl, or arylene; and at least one N, S, or O atom of the above formula is bonded to an aryl or arylene group, wherein the composition comprises at least about 0.5 percent by weight of the isocyanate-reactive compound.

8. The isocyanate-reactive composition of claim 7 wherein —X—X— is —NH—NH— or —O—O—.

9. The isocyanate-reactive composition of claim 8 wherein —X—X— is —NH—NH—.

10. The isocyanate-reactive composition of claim 7 wherein at least one N, S, or O atom is bonded to an aryl group.

11. The isocyanate-reactive composition of claim 7 wherein both N, S, or O atoms are bonded to an aryl or arylene group.

12. The isocyanate-reactive composition of claim 7 which has an equivalent weight of at least about 1,000.

13. A flexible polyurethane foam prepared by reacting a polyisocyanate with the isocyanate-reactive composition of claim 7, in the presence of a blowing agent.

14. The flexible polyurethane foam of claim 13, wherein the isocyanate-reactive compound is characterized by that —X—X— is —NH—NH— or —O—O—.

15. The flexible polyurethane foam of claim 14 wherein the isocyanate-reactive compound is characterized by that —X—X— is —NH—NH—.

16. The flexible polyurethane foam of claim 13, wherein the isocyanate-reactive compound is characterized by that at least one N, S, or O atom is bonded to an aryl group.

17. The flexible polyurethane foam of claim 13, wherein the isocyanate-reactive compound is characterized by that both N, S, or O atoms are bonded to an aryl or arylene group.

18. The flexible polyurethane foam of claim 13, wherein the isocyanate-reactive compound has an equivalent weight of at least about 1,000.

* * * * *